(12) United States Patent
Bothner

(10) Patent No.: US 7,511,266 B1
(45) Date of Patent: Mar. 31, 2009

(54) IRRADIATED FORMATION TOOL (IFT) APPARATUS AND METHOD

(76) Inventor: Ronald E. Bothner, 19 S. Pentenwell Cir., The Woodlands, TX (US) 77382

( * ) Notice: Subject to any disclaimer, the term of this patent is extended or adjusted under 35 U.S.C. 154(b) by 0 days.

(21) Appl. No.: 11/634,543

(22) Filed: Dec. 6, 2006

(51) Int. Cl.
*G01V 5/10* (2006.01)

(52) U.S. Cl. .................................. 250/269.2

(58) Field of Classification Search .............. 250/26.29, 250/269.2
See application file for complete search history.

(56) References Cited

U.S. PATENT DOCUMENTS

| | | | |
|---|---|---|---|
| RE24,383 E | | 10/1957 | McKay |
| 3,219,820 A | | 11/1965 | Hall, Jr. |
| 3,462,600 A | | 8/1969 | Dewan |
| 3,772,513 A | | 11/1973 | Hall, Jr. et al. |
| 4,005,290 A | * | 1/1977 | Allen ........................ 250/266 |
| 4,066,892 A | * | 1/1978 | Givens ....................... 376/165 |
| 5,081,351 A | | 1/1992 | Roscoe et al. |
| 5,105,080 A | | 4/1992 | Steller et al. |
| 5,521,378 A | | 5/1996 | Roscoe et al. |
| 5,608,215 A | | 3/1997 | Evans |
| 6,825,459 B2 | | 11/2004 | Bothner |
| 2006/0091307 A1 | * | 5/2006 | Griffiths et al. ............. 250/262 |

* cited by examiner

*Primary Examiner*—Constantine Hannaher
(74) *Attorney, Agent, or Firm*—James L. Jackson

(57) ABSTRACT

A well logging instrument that has a neutron source for irradiating earth formations traversing a borehole used in deriving useful information pertaining to said formations. Three detectors are mounted in a spaced-apart vertical relationship within a pressure-resistant housing. The detectors nearest and farthest from the neutron source detect thermal neutrons while the third detector from the neutron source detects a rare earth compensated aggregate capture gamma ray spectrum. By comparing the irradiated formations as detected by the three detectors, certain formation fluid, matrix, and pore volume parameters are derived. Also, by comparing the count rates of high and low energy ranges of the third detector in earth coal formation matrix, an ash volume is determined. From this value, a bulk density is derived from the corresponding earth coal formation.

11 Claims, 11 Drawing Sheets

IRRADIATED FORMATION TOOL (IFT) APPARATUS AND METHOD

BACKGROUND OF THE INVENTION

1. Field of the Invention

The present invention relates generally to a method and apparatus for the determination of the nature of the earth formations by neutron well logging. More specifically the present invention concerns the use of dual spaced detectors in a logging instrument in association with a third detector in the logging instrument and comparative data processing for detecting a ratio derived porosity measurement for the investigation of porous reservoir rock and coal bed formations. Even more specifically, the present invention concerns the use of a logging instrument having two substantially identical detectors and a differing third detector that are arranged to facilitate running of the logging instrument within well casing for optimized logging speed and efficiency and for achieving efficient and accurate formation logging. The logging instrument employs neutron-neutron sensors and a neutron-gamma capture sensor and a signal processing system that facilitates detection of signals for a ratio derived porosity measurement and capture gamma rays of various energies for earth formation evaluation.

2. Description of the Prior Art

Neutron well logging techniques and methods have been used to analyze earth formations along the traverse of a borehole for more than 30 years. One such accepted technique and method in accordance with prior art within the well logging industry to minimize the effects of formation capture properties resulting from salinity and shaliness as well as some borehole effects on the detection of thermal neutrons is by the use of two similar type detectors spaced differently from the neutron source. The signals from both detectors are combined to establish a ratio of detector count rates that is related to the porosity of the adjacent formation. While analyzing the dual detector signals could be used as a pore volume gas indicator, formation matrix change could be misleading. Also, differentiating between the oil and water phase of the pore volume has been questionable at best.

Another technique and method used to analyze earth formations along the traverse of a borehole is embodied in U.S. Pat. No. 3,772,513 of Hall, Jr. et al. This technique and method is used to determine the presence of hydrogen and chlorine (salinity) in a porous earth formation while compensating for shaliness and some borehole components. This in turn allows for water saturation determination and hydrocarbon identification. The device uses a rare earth sleeve or shield with a high capture cross-section and subsequent plurality emitting capture gamma radiation, surrounding a scintillation detector, to moderate neutron activity in the borehole and near-bore adjacent formations in order to achieve a balanced or compensated detector response from the formation capture gamma-rays of hydrogen and chlorine. The moderated formation capture hydrogen gamma-ray response could also be used to determine porosity if certain properties of the formation and borehole components are known.

Thus formation logging tools having a plurality of substantially identical detectors having substantially identical shields for significant thermal neutron induced gamma radiation response have been employed to establish a dual hydrogen or formation reference signal and a dual formation reference plus chlorine signal for detecting the presence of the chlorine constituent of salt water in the formation. However, these shielded detectors, being Neutron-Gamma scintillation type, made for a pore comparative ratio derived porosity measurement. Hence, a formation logging tool for additionally providing a Neutron-Neutron type ratio derived porosity measurement and a rare earth shielded, Neutron-Gamma scintillation type, capture gamma spectral measurement for identification of porous rock and coal bed formations intersected by a borehole has not, to the knowledge of the inventor, been available in the prior art.

In most cases it has been the practice to run formation logging instruments within an unlined borehole and to cause the logging tool to intimately engage a portion of the borehole wall, such as is shown in U.S. Pat. Nos. 3,219,820 and 3,772,513. The logging instruments of these patents each employ a decentralizing bow spring which engages the borehole wall and forces the housing of the instrument into intimate engagement with the open hole wellbore opposite the bow spring. When running a logging instrument through an open wellbore, efficient movement of the instrument may be subject to the interference of uneven wall surfaces, such as when relatively unconsolidated formation material is washed away by drilling fluid or sloughs into the wellbore. Additionally, these adverse wellbore conditions can cause the tools to become stuck in the wellbore resulting in costly retrieval or "fishing" operations for the operator of the well. If known hydrocarbon productive earth formations are present traversing the wellbore, it is more conducive and cost effective for the operator to lower and cement steel casing in the wellbore to secure and insure the integrity of the wellbore before well logging operations being. Unfortunately, the presence of steel casing eliminates or precludes most well logging tools to effectively measure the parameters of the earth formations within their design capability. Thus it is desirable to provide a formation logging instrument having a known two substantially identical detector arrangement and also having a third dissimilar detector, together with a signal processing system, additionally providing an efficient ratio derived porosity measurement and water saturation measurement for identification of porous rock and coal bed formations intersected by a cased borehole.

SUMMARY OF THE INVENTION

It is the principal object of the present invention to provide improvements in the method and apparatus disclosed in the aforementioned U.S. Pat. No. 3,772,513; particularly in the spectral capture gamma ray method.

It is also an important object of the present invention to incorporate these improvements with a ratio derived porosity measurement for the investigation of porous reservoir rock and coal bed formations.

Briefly the present invention involves improvements in neutron well logging method and apparatus, which may be embodied in a logging system comprising an instrument, which includes a neutron source for irradiating earth formations as it is passed along the borehole. Spaced at predetermined distances from the source in the instrument along the longitudinal axis of the borehole, these are two substantially identical detectors. The closer of these two detectors to the source is a Neutron-Neutron (N-N) detector and the farther of these two detectors from the source is also a Neutron-Neutron (N-N) detector. The proximity of these two detectors with respect to the source designates the N-N detectors as the Near detector and the Far detector. The Near and Far detectors detect thermal neutrons that, in turn, are converted electronically into pulses. These pulses are then recorded in a time event as counts/second for the respective detectors. A ratio of the Near detector and Far detector count rates can then be used for formation pore volume ($\Phi$) determination.

A third detector is also located within the instrument and along the longitudinal axis of the borehole. This third detector is a Neutron-Gamma (N-G) detector that detects capture gamma radiation. The aggregate capture gamma radiation energies detected by the N-G detector are from 0 to 10 Million electron Volts (MeV) and are converted electronically into equivalent electronic pulses. These pulses, in turn, are recorded in a time event as counts/second and are simultaneously proportioned into sequential separate energy ranges or windows of 0.5 MeW. The count rate of those 0.5 MeV energy ranges or windows that comprise the aggregate spectrum from 1 to 3.5 MeV are added and summed to equal a Total Low Energy Sum (TLES) while the count rate of those 0.5 MeV energy ranges or windows that comprise the aggregate spectrum from 3.5 to 10 MeV are added and summed to equal a Total High Energy Sum (THES).

Surrounding the N-G detector, there is provided a sleeve or shield of selected rare earth material having a high capture cross-section for neutrons and characterized by having a significant thermal neutron induced capture gamma radiation energy response in the TLES part of the aggregate spectrum and having an insignificant capture gamma radiation response in the THES part of the aggregate spectrum. The selected material of the shield and the functionality of the shield are explained in U.S. Pat. No. 3,772,513 and other preferred embodiments.

By comparing the count rate of the THES with that of the TLES, the pore volume fluid is determined as to the presence or absence of hydrocarbons and an apparent sigma water ($\Sigma_{wa}$) is derived. By incorporating sigma water ($\Sigma_{wa}$) with that of the pore volume ($\Phi$) determination from the ratio of the N-N detectors, a sigma log ($\Sigma_{log}$) is generated with accurate water saturation for the corresponding earth formation. And, by comparing the count rate of the THES with the responses of the N-N detectors, earth formation matrix change is discerned.

Also, by comparing the count rate of the THES with that of the TLES in earth coal formation matrix, an ash volume ($V_{ash}$) is determined. From this value, a bulk density ($\rho_b$) is derived for the corresponding earth coal formation.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
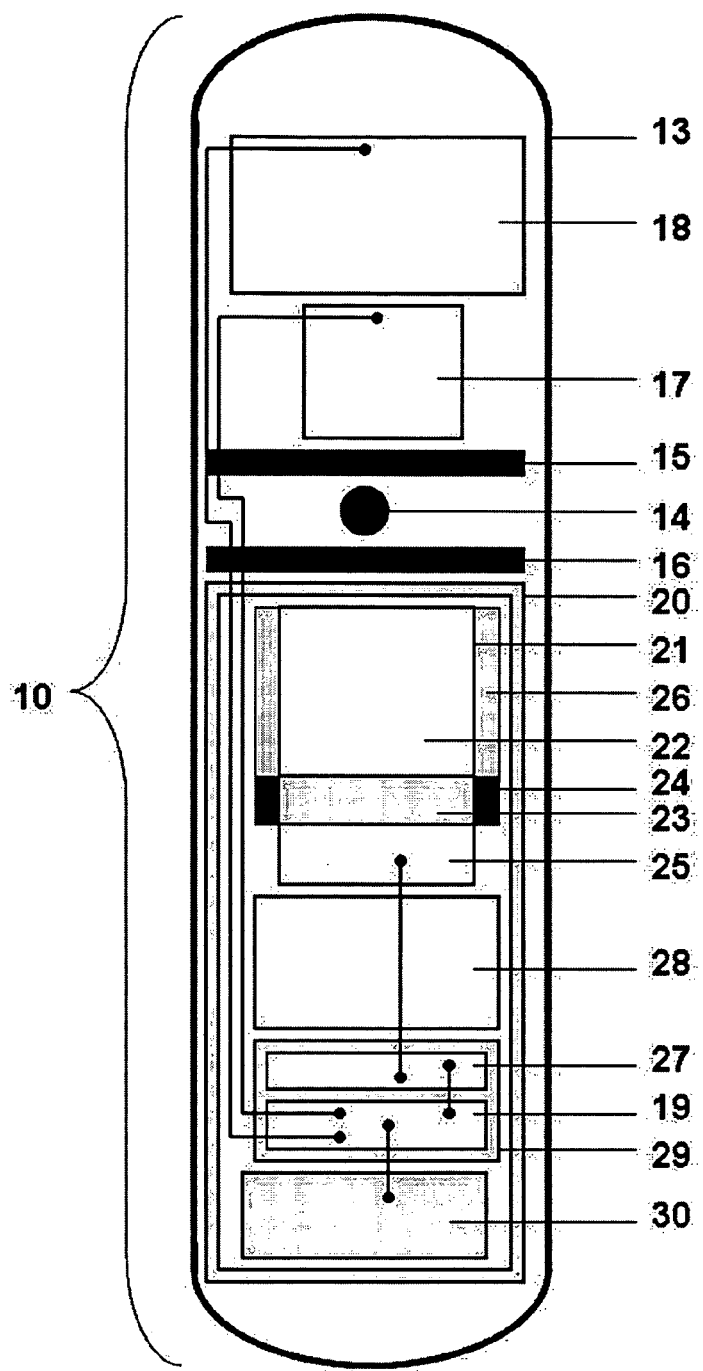
FIG. 1 is a schematic view of the well logging apparatus in accordance with the present invention.

Turning now to FIG. 1, numeral 10 designates the well logging apparatus or tool in accordance with the present invention. An elongated housing 13 adapted for lowering into a borehole to a desired depth of a subterranean formation that is fluid tight and pressure resistant. Mounted inside the housing 13 above and below a neutron emitting source 14 are an upper neutron shield 15 and a lower neutron shield 16. The shields 15 and 16 may be composed of lead, tungsten, boron or a combination of one or more of these elements. These shields 15 and 16 prevent a direct path for emitted neutrons from the source 14 internally to the tool 10.

Mounted above the upper neutron shield 15 in the upper part of the housing 13 are two substantially identical Neutron-Neutron (N-N) detectors 17 and 18 having substantially identical function and operation. The arrangement of the two N-N detectors with respect to the distance from the neutron emitting source 14 designates the closest N-N detector 17 as the Near detector and the other N-N detector 18 as the Far detector. The arrangement of the two N-N detectors with respect to the distance of the neutron emitting source 14 is sufficiently greater than what is needed for absorption or capture of the diffusing neutrons in the borehole by the borehole component of the well bore.

The process of neutron flux distribution from a neutron emitting source 14 relative to a well bore's borehole component and adjacent earth formation parameters has been described in prior art and patents including U.S. Pat. No. 6,825,459, the inventor of record is the inventor of the present preferred embodiment. The emitted neutron population distribution or flux is dependent on the borehole component and earth formations' porosity, salinity, and matrix material. The use of two detectors spaced at difference distances from a neutron source and the ratio derived from the measurements, by the two detectors, calibrated to known position earth matrix material has long been an accepted practice of formation porosity determination with neutron-neutron type well logging tools.

Such is the case in part for the present invention. The Near detector 17 and the Far detector 18 are both composed of a tube with pressurized $He^3$ gas with, longitudinally, a central anode wire and a concentric cylindrical cathode. Neutrons, from the neutron emitting source 14 that are not thermalized and captured by the borehole component, the earth formation fluid and earth matrix material, which are back scattered to each of these detectors, collide with the $He^3$ atoms ionizing the gas between the anode and the cathode producing an electrical pulse in the electrodes of each detector. The number of pulses is proportional to the rate of neutron collision in each detector. The pulses from the Near detector 17 and the Far detector 18 are transmitted to the memory circuit 19 and stored in a form of data as a function of time. By comparing the depth adjusted number of pulses of both the Near detector 17 and that of the Far detector 18, a Near/Far ratio can be determined. And as to prior art, the resultant ratio can be calibrated to known porosities of known earth matrix material (earth formation).

Turning again to FIG. 1, mounted inside the housing 13 is an insulated chamber 20 made in the form of a Dewar flask that extends through the lower part of the housing 13 below the lower neutron shield 16. Mounted within the Dewar flask 20 at a sufficient distance from the neutron emitting source 14 is a Neutron-Gamma (N-G) detector 21 having a scintillation crystal 22, a photomultiplier tube 23 with a surrounding anti-magnetic shield 24, and an electronic unit 25. Also surrounding the N-G detector 21 is a shield 26, composed of samarium, having a high capture cross-section or absorption coefficient for back scattered neutrons from the neutron emitting source 14 that are not thermalized and captured by the borehole component, the earth formation fluids and earth matrix materials. The samarium shield 26 is characterized as having a significant and distinctive capture gamma spectral energy response within the aggregate capture gamma spectra striking the N-G detector 21 from the contributing borehole component, the earth formation fluid, and earth matrix material. Other material for the shield 26 and its functionality are explained both in U.S. Pat. No. 3,772,513 and in U.S. Pat. No. 6,825,459 as well as other preferred embodiments.

Turning once again to FIG. 1, in the N-G detector 21, the photomultiplier tube 23, converts light energies produced by the scintillation crystal 22 being struck by capture gamma radiation of different energies and intensities generated from the elemental isotopic decay of the capturing elements composing the earth formations' fluid and matrix material, borehole component, and shield 26 into equivalent and proportional electrical voltages ranging from 0 to 10 Million electron Volts (MeV) which are processed by the electrical unit 25. The electrical unit 25 further segregates the electrical voltages of the corresponding capture gamma energies and intensities that struck the N-G detector 21 into sequential 0.5 MeV segments or windows across the 0 to 10 MeV range. The equivalent and proportional electrical voltages detected in each of the sequential 0.5 MeV windows are converted to electrical pulses relative to intensity (number) of voltages and sent, from each 0.5 MeV segment, to the microprocessor 27 which in turn transmits the respective sequential 0.5 MeV window pulses to the memory circuit 19 and stored in a form of data as a function of time. This form of data along with the Near and Far data as a function of time in the memory circuit is stored as a rate of occurrence in counts per second (CPS). This stored data, from the sequential 0.5 MeV windows, along with the stored Near and Far data could then be transmitted and recorded to the surface using one of various techniques common in prior art in accordance with neutron well logging. For this preferred embodiment, all stored data is obtained from the memory circuit 19 upon retrieval of the tool 10 from the borehole. The data is then merged with a memorized depth record as a function of time, recorded at the surface, corresponding to the time that the tool 10 was in the borehole. This relationship of data as a function of time versus depth as a function of corresponding time yields data as a function of depth permitting the data to be presented in a well log format.

Turning still again to FIG. 1, a heat sink 28 is mounted below the N-G detector 21 inside the Dewar flask 20. The heat sink 28 maintains constant temperature inside the Dewar flask 20 over a finite time period as the tool 10 is lowered into the borehole. Also within the Dewar flask 20 and below the heat sink 28 is mounted an electronic assembly 29 that controls and regulates power distribution for the tool 10 high voltage and low voltage needs. The electronic assembly 29 contains the aforementioned microprocessor 27 and memory circuit 19. The electronic assembly 29 may be powered from a source of electricity on the surface via a conducting cable or by utilizing a down-hole mud motor or turbine generator. For this preferred embodiment, a battery pack 30 was selected.

Once the data is retrieved from the tool 10 and merged with depth, then several layers of processing are needed to convert the data into useful values that can be used for the determination of the earth's formation porosity, fluid, and matrix material. The Near and Far data is converted to a ratio and formation porosity ($\Phi$) is derived in accordance with prior art.

Figure 2:
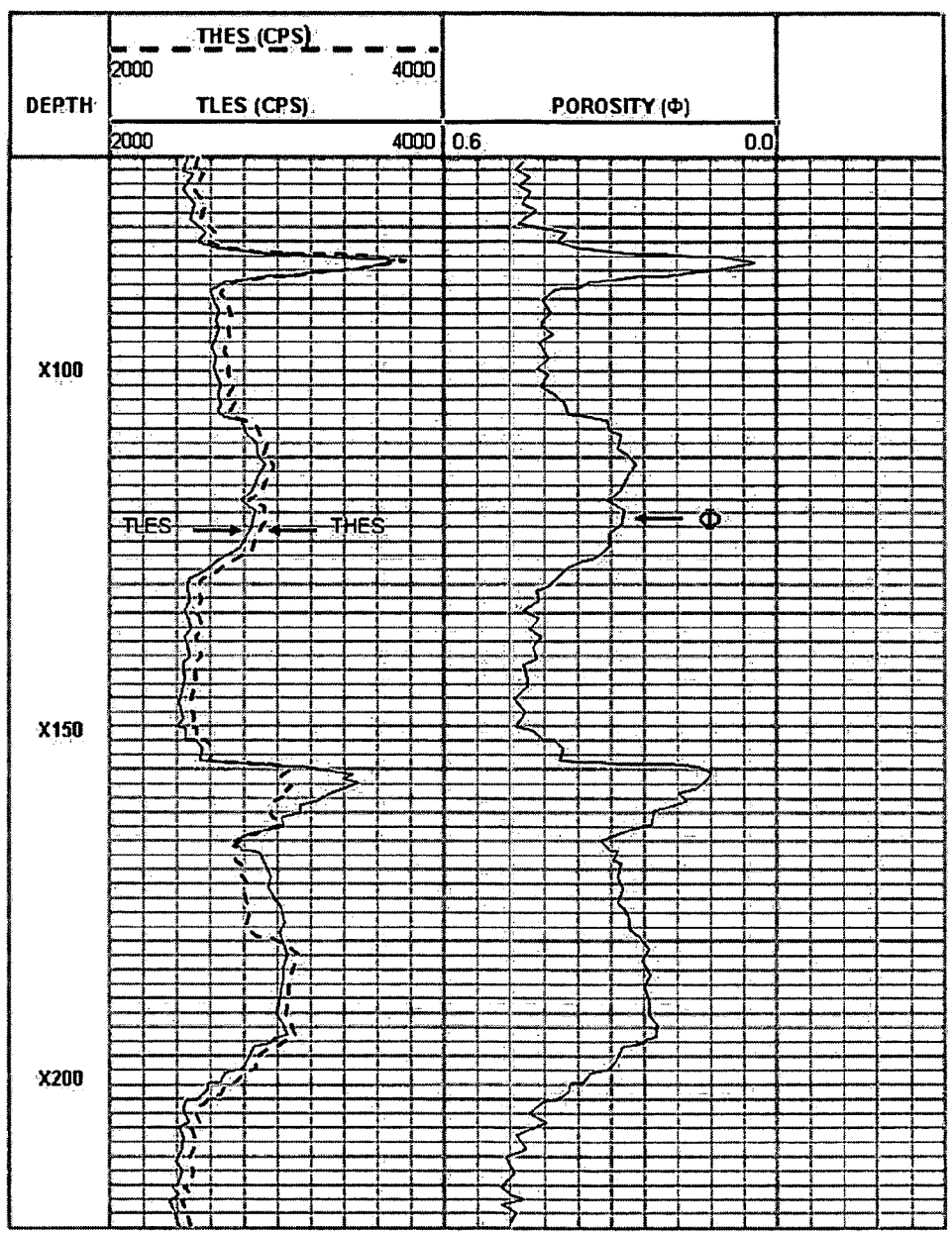
FIG. 2 is a representative log format record of processed data that may be made in accordance with this invention.

Next, the data from the sequential 0.5 MeV windows that correspond to the intensity of the capture gamma radiation energies that occurred between 1.0 MeV and 3.5 MeV are summed to produce the TLES (Total Low Energy Sum). Then, the data from the sequential 0.5 MeV windows that correspond to the intensity of the capture gamma radiation energies that occurred between 3.5 MeV and 8.0 MeV are summed to produce the THES (Total High Energy Sum). The TLES, THES, and $\Phi$ can be presented as curves in a well log format against depth (FIG. 2). For this preferred embodiment, $\Phi$ will always be expressed as a decimal equivalent value.

Figure 3:
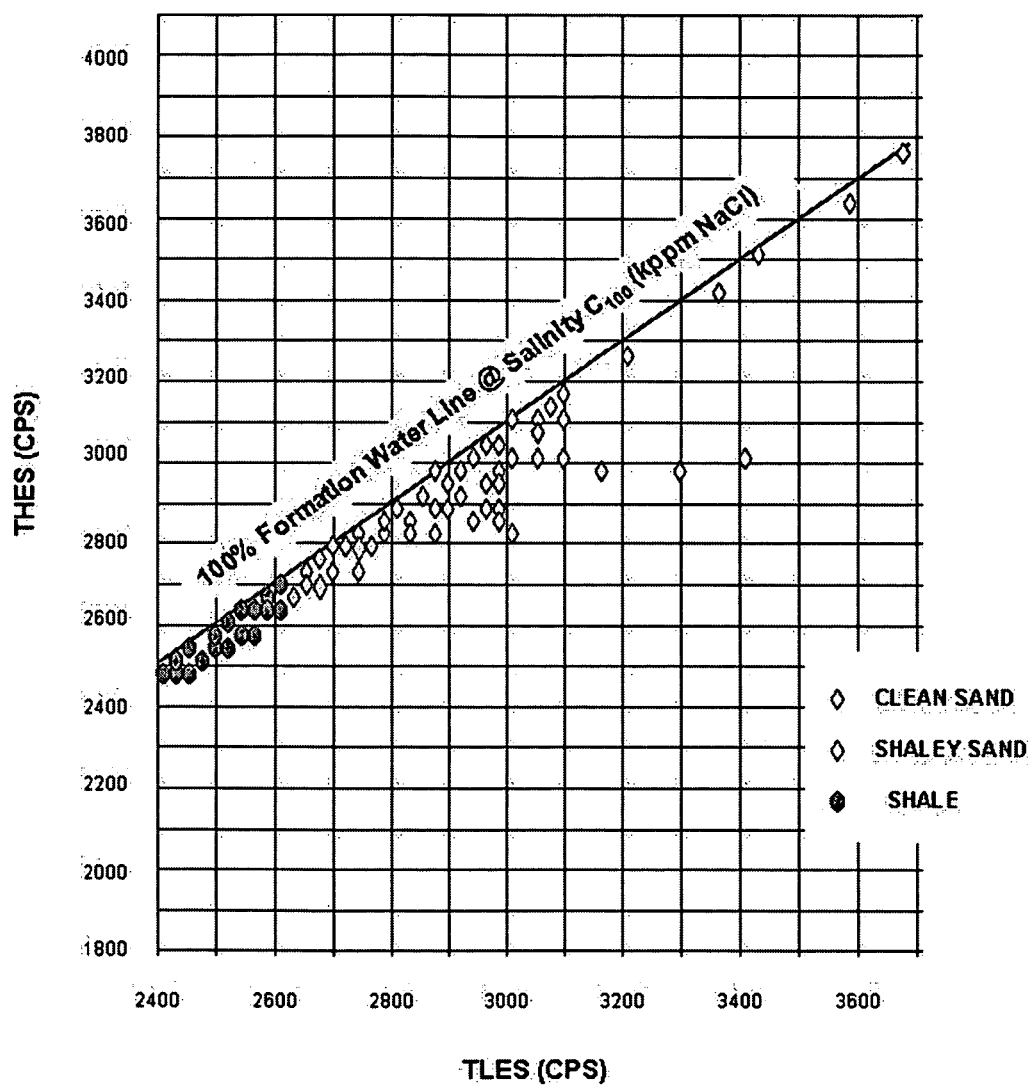
FIG. 3 is a graphical plot (cross plot) illustrating a procedure for the interpretation of the processed data in accordance with this invention as to prior art.

When the THES and TLES are cross-plotted and a 100% formation water line at salinity $C_{100}$ in kppm (1000 parts per million) of NaCl concentration is determined (FIG. 3), then $THES_{100}$ can be derived in the manner of $y=m*x+b$.

$$THES_{100} = (\text{slope of 100\% formation line}) * TLES + THES \text{ intercept} \quad (1)$$

Figure 4:
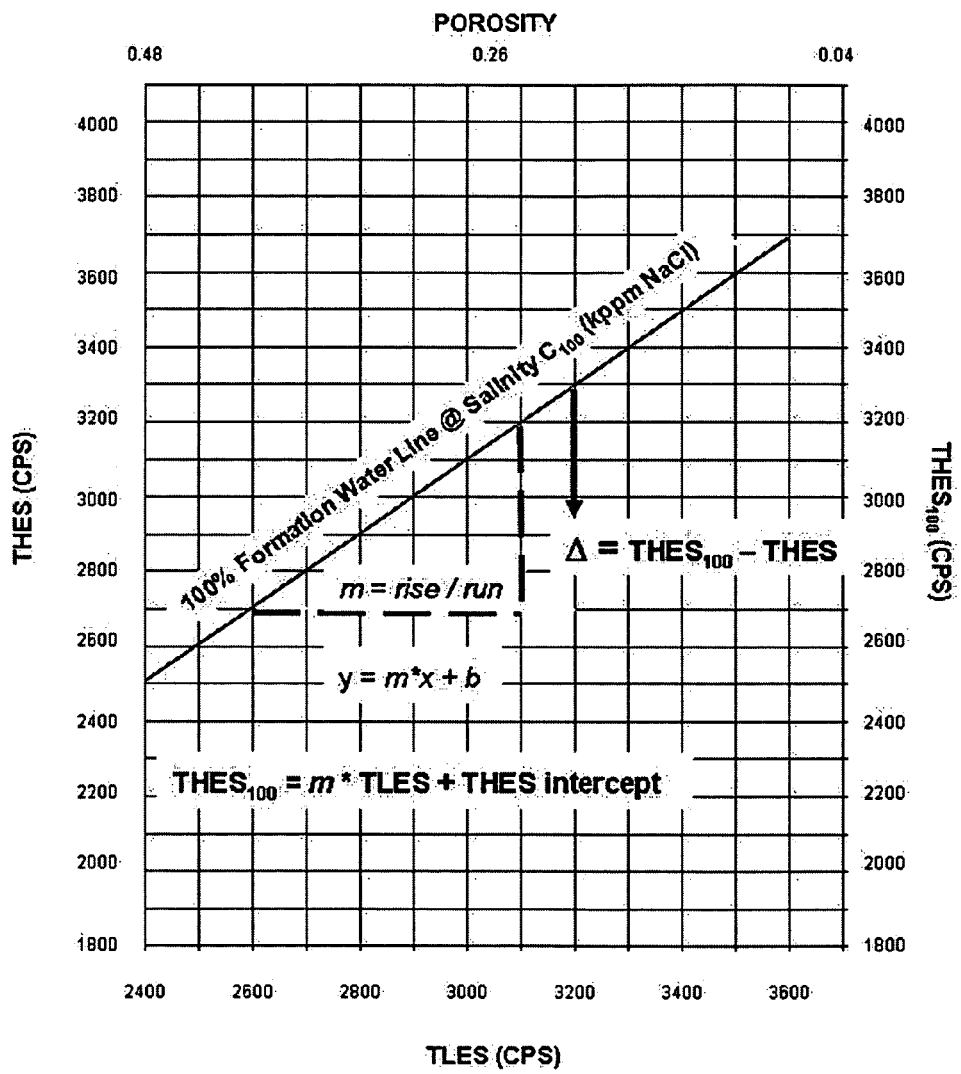
FIG. 4 is a graphical plot illustrating the creation of $THES_{100}$ and the $\Delta$ and THES relationship in respect to FIG. 3.

$THES_{100}$ and THES will now equal one another on the 100% formation line at salinity $C_{100}$ as TLES changes in value (FIG. 4). As in FIG. 4, any derivation ($\Delta$) or drop in THES value from the corresponding $THES_{100}$ value on the 100% formation water line can be characterized as:

$$\Delta = THES_{100} - THES \quad (2)$$

which is extrapolated to:

$$\Delta_{100} = THES_{100} - THES_F \quad (3)$$

where $\Delta_{100}$ is the total derivation or drop in THES value from the corresponding $THES_{100}$ value on the 100% formation line at salinity ($C_{100}$) to a freshwater formation value ($THES_F$). The value of $\Delta_{100}$ will change as the corresponding value of TLES changes as a function of porosity ($\Phi$). Theoretically the maximum value of $\Delta_{100}$ would be obtained at a porosity of 1 and diminish to a value of 0 at porosity 0. The maximum or total value of $\Delta_{100}$ at a porosity of 1 would be defined as $\Delta_T$ and thus, $\Delta_{100}$ can be characterized as:

$$\Delta_{100} = \Delta_T * \Phi \quad (4)$$

The value of $\Delta_T$ can be determined utilizing test pit data, as to prior art, and TLES can be calibrated to the derived porosity measurement from the tool (10). Combining equations 2 and 3 yields:

$$\Delta/\Delta_{100} = (THES_{100} - THES)/(THES_{100} - THES_F) \quad (5)$$

The ratio $\Delta/\Delta_{100}$ can also be expressed in a similar manner using corresponding relative chlorine capture or absorption coefficients expressed as eta ($\eta$).

$$\Delta/\Delta_{100} = (\eta_{100} - \eta)/(\eta_{100} - \eta_F) \quad (6)$$

$\eta$ is a ratio of thermal neutron capture cross-sections with values between 0 in freshwater formations to above 0.8 in saturated saltwater formations ($C_f = 250$ kppm NaCl). $\eta_{100}$ is the absorption coefficient for the corresponding salinity $C_{100}$ of the 100% formation line with $\eta_F$ being that of freshwater. Since $\eta_F=0$, then:

$$\Delta/\Delta_{100}=(\eta_{100}-\eta)/\eta_{100} \quad (7)$$

Solving for $\eta$ at salinity $C_{100}$:

$$\eta=\eta_{100}-(\Delta/\Delta_{100})*\eta_{100} \quad (8)$$

Since the macroscopic thermal neutron capture cross-section is the probability per unit length of absorption, $\eta$ could be expressed:

$$\eta=(\Sigma_W-\Sigma_F)/\Sigma_T \quad (9)$$

where $\Sigma_T$ is the total thermal neutron capture cross-section for saturated saltwater and $(\Sigma_W-\Sigma_F)$ is the partial thermal neutron capture cross-section given $\Sigma_W$ (sigma water at salinity C) minus $\Sigma_F$ (sigma freshwater). As per prior art that $\Sigma_W$ can be defined as to water salinity C in equation:

$$\Sigma_W=22.1957+0.3384C+1.7587*10^{-4}C^2+0.1340*10^{-6}C^3 \quad (10)$$

Then, if $\Sigma_W=\Sigma_T$ at 119.8813 capture units ($10^{-3}$cm$^{-1}$) and $\Sigma_F=22.1957$ capture units ($10^{-3}$cm$^{-1}$), equation 8 would yield a $\eta=0.8149$ for saturated saltwater C at 250 kppm (1000 parts per million) NaCl concentration. The maximum value of 0.8149 would be the total for the ratio of thermal neutron capture cross-section or total absorption (capture) coefficient ($\eta_T$) for $\Sigma_T$ of 119.8813 capture units at 250 kppm NaCl ($C_T$).

Since equation 8 and equation 9 are proportional with respect to $\eta$, substituting equation 9 for $\eta$ in equation 8 yields:

$$(\Sigma W-\Sigma_F)/(\Sigma_T=\eta_{100}-(\Delta/\Delta_{100})*\eta_{100} \quad (11)$$

Solving for $\Sigma_W$ at salinity $C_{100}$:

$$\Sigma_W=\Sigma_F+(\Sigma_T*\eta_{100})-[\Sigma_T*(\Delta/\Delta_{100})*\eta_{100}] \quad (12)$$

$\eta_{100}$ at salinity $C_{100}$ can be determined for the 100% formation water line by incorporating equation 10 into equation 9:

$$\eta_{100}=[(22.1957+0.3384C_{100}+1.7587*10^{-4}C_{100}^2+0.1340*10^{-6}C_{100}^3)-\Sigma_F]/\Sigma_T \quad (13)$$

And since $\Sigma_F=22.1957$ capture units, equation 13 becomes:

$$\eta_{100}=(0.3384C_{100}+1.7587*10^{-4}C_{100}^2+0.1340*10^{-6}C_{100}^3)/\Sigma_T \quad (14)$$

Then, by substituting equation 14 for $\eta_{100}$ in equation 12 yields:

$$\Sigma_W=\Sigma_F+[\Sigma_T*(0.3384C_{100}+1.7587*10^{-4}C_{100}^2+0.1340*10^{-6}C_{100}^3)/\Sigma_T]-[\Sigma_T*(\Delta/\Delta_{100})*(0.3384C_{100}+1.7587*10^{-4}C_{100}^2+0.1340*10^{-6}C_{100}^3)/\Sigma_T] \quad (15)$$

which becomes:

$$\Sigma_W=(\Sigma_F+0.3384C_{100}+1.7587*10^{-4}C_{100}^2+0.1340*10^{-6}C_{100}^3)-[(\Delta/\Delta_{100})*(0.3384C_{100}+1.7587*10^{-4}C_{100}^2+0.1340*10^{-6}C_{100}^3)] \quad (16)$$

Since $\Sigma_F=22.1957$ capture units, equation 16 becomes:

$$\Sigma_W=(22.1957+0.3384C_{100}+1.7587*10^{-4}C_{100}^2+0.134*10^{-6}C_{100}^3)-[(\Delta/\Delta_{100})*(0.3384C_{100}+1.7587*10^{-4}C_{100}^2+0.1340*10^{-6}C_{100}^3)] \quad (17)$$

Since $\Sigma_{W100}=22.1957+0.3384C_{100}+1.7587*10^{-4}C_{100}^2+0.1340*10^{-6}C_{100}^3$ and $(\Sigma_{W100}-\Sigma_F)=0.3384C_{100}+1.7587*10^{-4}C_{100}^2+0.1340*10^{-6}C_{100}^3$, equation 17 can be expressed as:

$$\Sigma_W=\Sigma_{W100}-[(\Delta/\Delta_{100})*(\Sigma_{W100}-\Sigma_F)] \quad (18)$$

By substituting equation 4 for $\Delta_{100}$ in equation 18 yields:

$$\Sigma_W=\Sigma_{W100}-[\Delta/(\Delta_T*\Phi)*(\Sigma_{W100}-\Sigma_F)] \quad (19)$$

Figure 5:
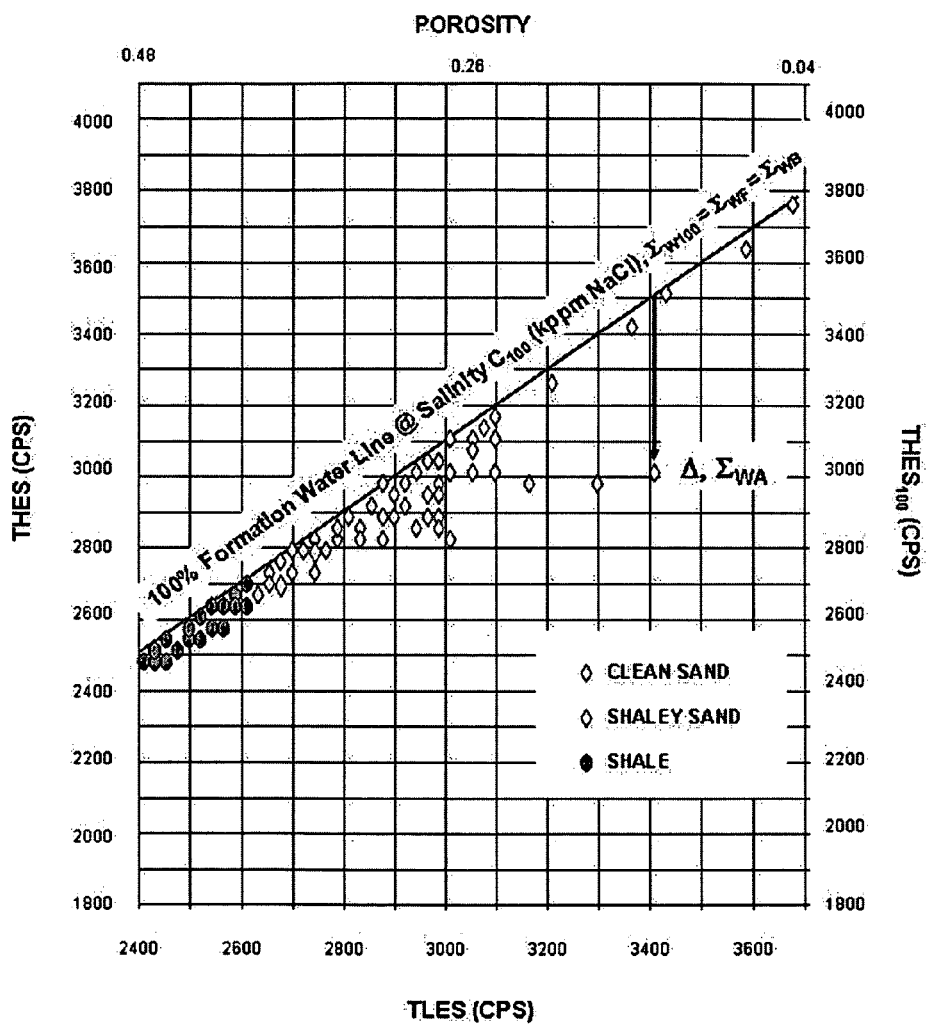
FIG. 5 is a graphical plot illustrating the $\Delta$ and $\Sigma_{WA}$ relationship in respect to FIG. 3 and FIG. 4.

Turning to FIG. 5, if there is no deviation or drop in the THES value from the corresponding THES$_{100}$ value on the 100% formation water line, then $\Delta$ remains unchanged and the calculated $\Sigma_W$ becomes $\Sigma_{W100}$ and is representative of 100% water saturation ($S_{w100}$) at salinity $C_{100}$. Any derivation or drop in the THES value from the corresponding THES$_{100}$ value on the 100% formation water line results in a change in $\Delta$ and is a decrease in total water saturation ($S_{WT}$) rendering the calculated $\Sigma_W$ apparent for all the pore fluids ($\Sigma_{WA}$). Since, according to prior art, one of the effects of the samarium shield 26 is shale compensated (corrected) matrix linearity with respect to the THES and TLES cross-plot regarding the 100% formation water line, $\Sigma_{W100}$ equals $\Sigma_{WF}$ (sigma water free) which also equals $\Sigma_{WB}$ (sigma water bound). This allows for the determination of $S_{WT}$ using the calculated apparent $\Sigma_{WA}$ expressed in the relationship as to prior art:

$$S_{WT}=\Sigma_{WA}-[S_{WB}*(\Sigma_{WB}-\Sigma_{WF})]-\Sigma_H/(\Sigma_{WF}-\Sigma_H) \quad (20)$$

Note that $S_{WB}$ (bound water saturation) which numerically is equal to $V_{SH}$ (shale volume) has no influence when solving for $S_{WT}$ with $\Sigma_{W100}=\Sigma_{WB}=\Sigma_{WF}$:

$$S_{WT}=(\Sigma_{WA}-\Sigma_H)/(\Sigma_{W100}-\Sigma_H) \quad (21)$$

$\Sigma_H$ equals sigma hydrocarbon and for the purposes of this invention will be taken to equal 21 or 10 capture units for oil or gas respectively as to prior art. And, accordingly, the presence or absence of hydrocarbons expressed as $S_H$ (hydrocarbon saturation) would be inferred as 1 minus $S_{WT}$.

Figure 6:
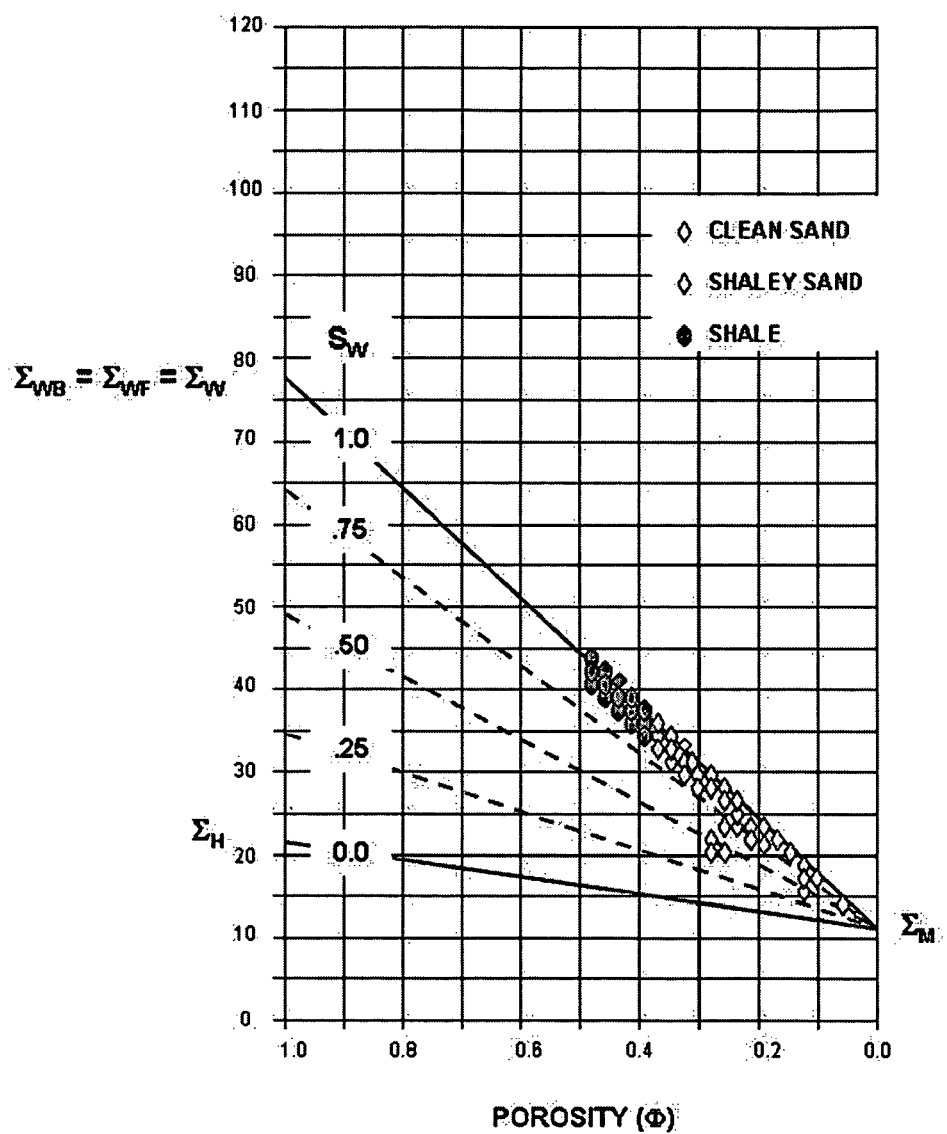
FIG. 6 is a graphical plot illustrating a procedure for the interpretation of the derived data in accordance with this invention as to prior art.

Also, the calculated apparent $\Sigma_{WA}$ can be used with the derived porosity measurement ($\Phi$) from the tool (10) to determine $\Sigma_{LOG}$ by simply using a clean water bearing formation model and substituting $\Sigma_{WA}$ for $\Sigma_W$:

$$\Sigma_{LOG}=[(1-\Phi)*\Sigma_{MA}]+\Phi*\Sigma_{WA} \quad (22)$$

where $\Sigma_{LOG}$ is the capture cross-section representing the total constituents of the earth formation comprising total porosity ($\Phi$), formation matrix ($\Sigma_{MA}$), and sigma apparent for all the pore fluids ($\Sigma_{WA}$). $\Sigma_{LOG}$ and $\Phi$ can then be cross plotted as in FIG. 6.

And finally as to prior art, if water saturation ($S_{WT}$) determination was calculated for $\Sigma_{LOG}$:

$$S_{WT}=[(\Sigma_{LOG}-\Sigma_{MA})-\Phi*(\Sigma_H-\Sigma_{MA})]/\Phi*(\Sigma_{W100}-\Sigma_H) \quad (23)$$

Figure 7:
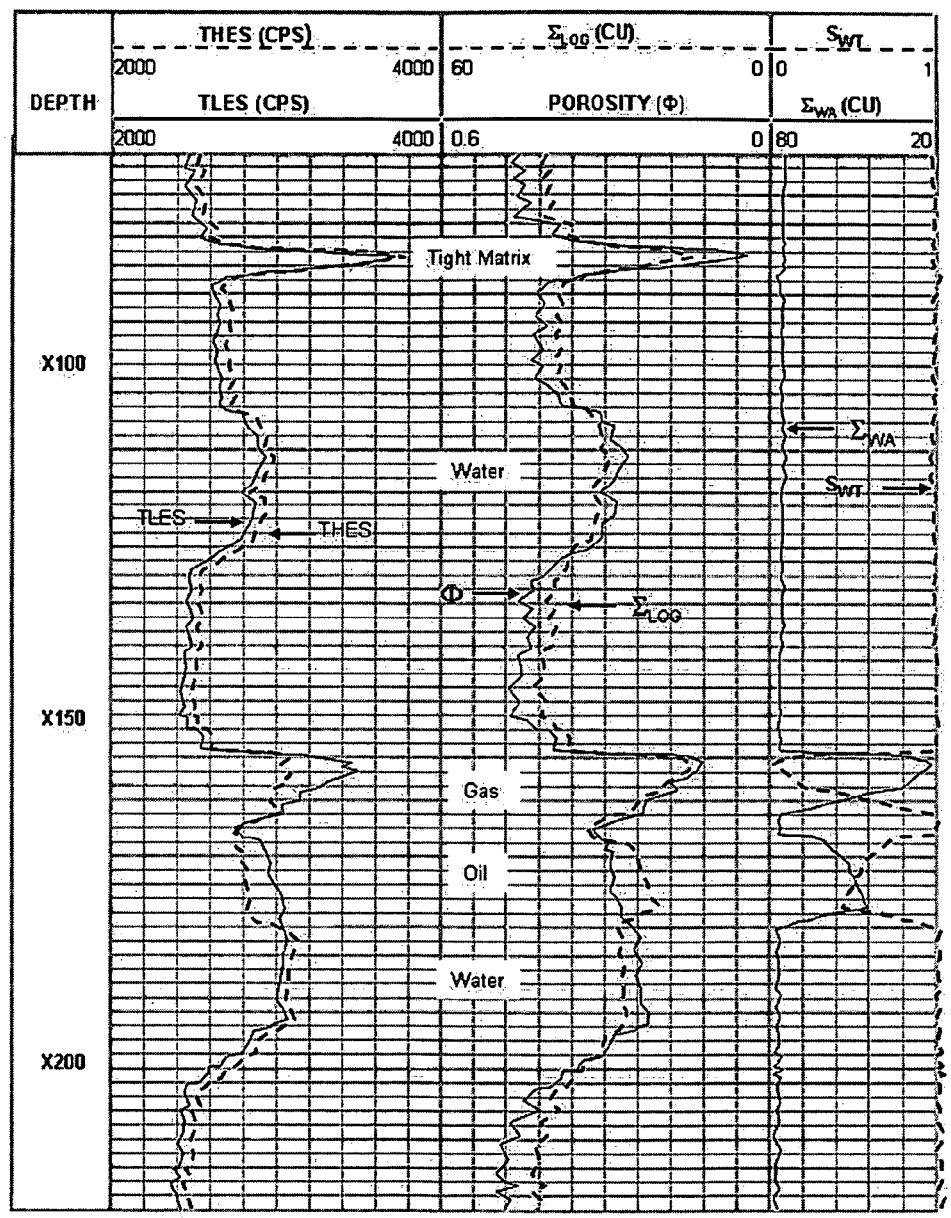
FIG. 7 is a representative log format record of processed and derived data that may be made in accordance with this invention.
Figure 8:
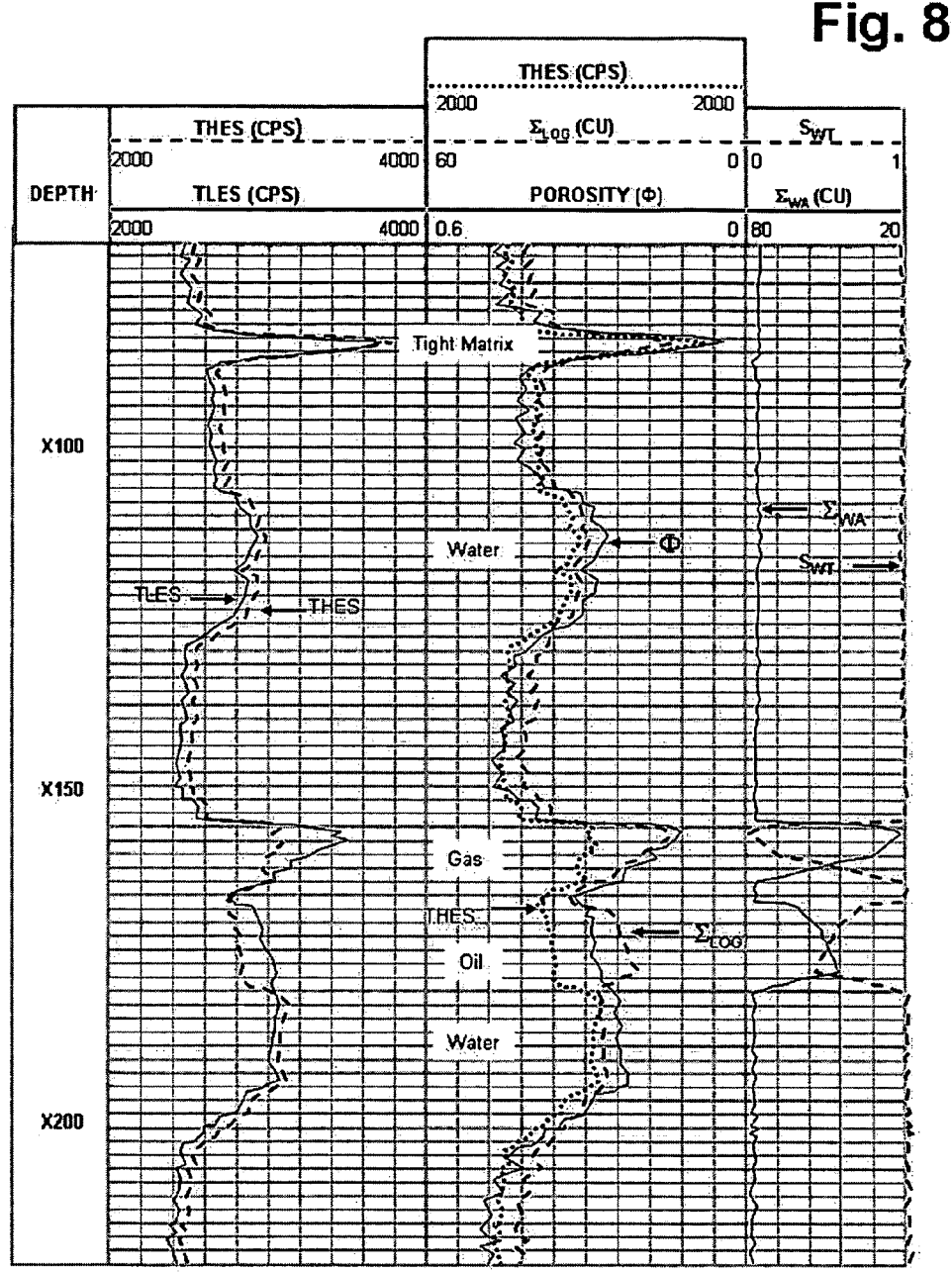
FIG. 8 is an additional representative log format record of processed and derived data that may be made in accordance with this invention.

$S_{WT}$ in equation 19 would equal $S_{WT}$ in equation 17 using corresponding values for associated variables. $S_{WT}$, $\Sigma_{LOG}$, and $\Sigma_{WA}$ can also be presented in a log format (FIG. 7) with the processed data for the determination of earth formation fluids and matrix parameters. Comparing the THES data to the calculated data in a log format (FIG. 8) magnifies these changes. Also, by directly comparing $\Sigma_{LOG}$ to a previously measured $\Sigma_{LOG}$ from a PNL (Pulsed Neutron Log) type logging tool that has been run in a well bore allows for a quick look analysis of changes that may have occurred in the earth formation fluids such as gas, oil, and water movement (contacts).

The well logging apparatus or tool 10 in accordance with the present invention has additional application in determination of ash in coal formation and, by extension, the matrix density. In coal formations or coal beds when the formation water salinity C decreases low enough and chlorine no longer dominates neutron capture, then the capture cross-sections of the various elements that compose the adjacent formation matrices and the total dissolved solids (TDS) in freshwater will start to dominate the THES component of the tool 10 measurement.

Figure 9:
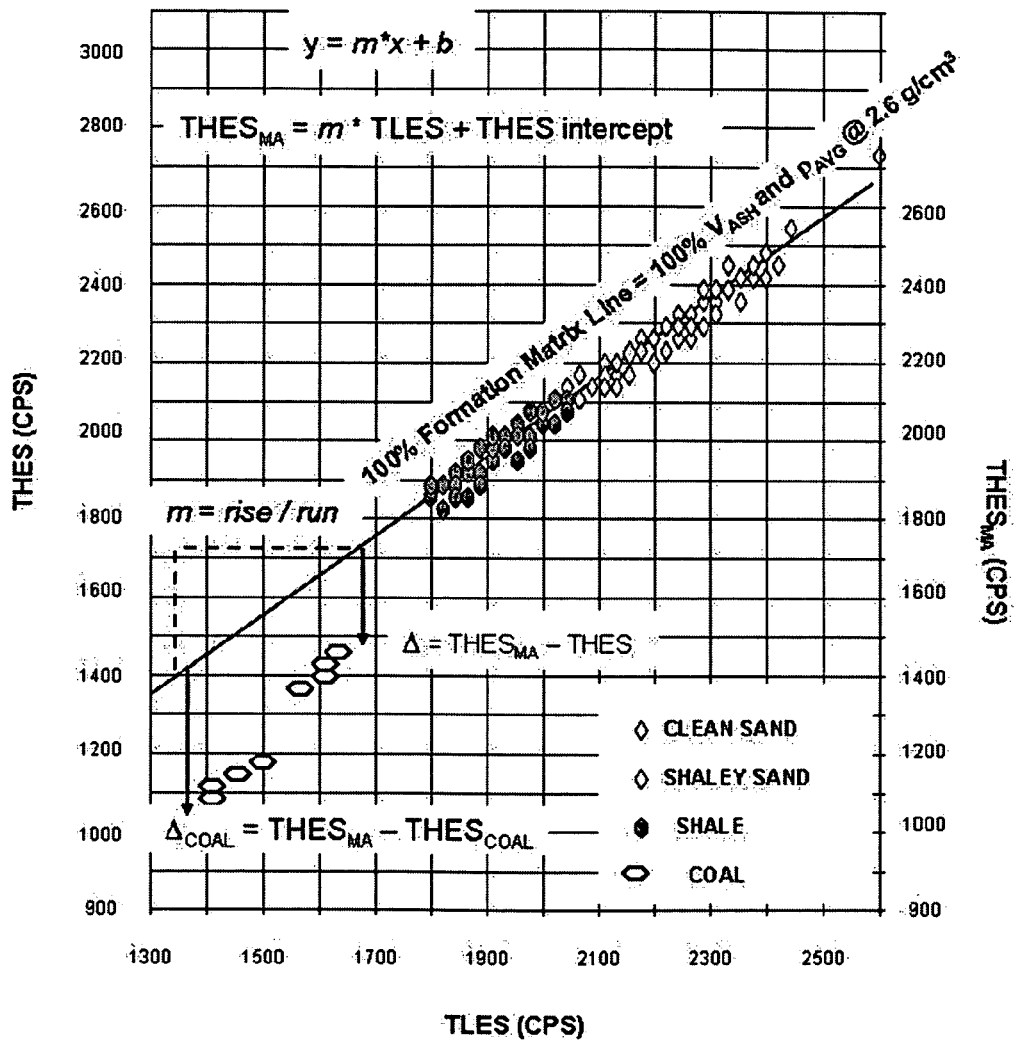
FIG. 9 is a graphical plot (cross plot) illustrating a procedure for the interpretation of the processed and derived data for coal bed formations in accordance with this invention.

Now turning to FIG. 9, when the THES and the TLES are cross-plotted and a 100% formation matrix line is determined, then $THES_{MA}$ is derived in the manner of y=m*x+b.

$$THES_{MA}=(\text{slope of 100\% formation matrix line}) * TLES+THES \text{ intercept} \quad (23)$$

$THES_{MA}$ and THES will now equal one another one the 100% formation matrix line as TLES changes in valve. In coal bed analysis, $THES_{MA}$ can be assumed to equal 100% ash volume ($V_{ASH}$) since ash is defined as the inorganic matter or elements contaminating pure coal. These contaminating elements are the same base elements that compose the adjacent formation matrices that dominate the neutron capture in very low salinity environments. The derivation ($\Delta_{COAL}$) in THES value from the corresponding $THES_{MA}$ value on the 100% formation matrix line to 100% coal (0% ash) can be characterized as:

$$\Delta_{COAL}=THES_{MA}-THES_{COAL} \quad (25)$$

where $\Delta_{COAL}$ is the total deviation or drop in THES value from the corresponding $THES_{MA}$ value on the 100% formation matrix line to the lowest coal formation value ($THES_{COAL}$) measured in a pure coal bed with no known ash volume. Any deviation ($\Delta$) in THES value from the corresponding $THES_{MA}$ value on the 100% formation matrix line towards the 100% coal (0% ash) can be characterized as:

$$\Delta=THES_{MA}-THES \quad (26)$$

This deviation ($\Delta$) would represent a decrease in ash volume ($V_{ASH}$). The proportional percentage decrease in ash volume ($V_{ASH}$) can be characterized as:

$$V_{ASH}=[(\Delta_{COAL}-\Delta)/\Delta_{COAL}]*100 \quad (27)$$

Since one of the aforementioned effects of the samarium shield 26 is matrix linearity with respect to the THES and TLES cross-plot, then $THES_{MA}$ can be assumed to equal an average density ($\rho_{AVG}$) of the corresponding formation matrices comprising the 100% formation matrix line. It can then be postulated that:

$$\Delta=\rho_{AVG}-\rho_B \quad (28)$$

$$\Delta_{COAL}=\rho_{AVG}-\rho_{COAL} \quad (29)$$

where $\rho_B$ is the density of the deviation ($\Delta$) from the average formation matrix density ($\rho_{AVG}$) line and $\rho_{COAL}$ is the minimum density of coal. That being, then by substituting equations 28 and 29 into equation 27 for $\Delta$ and $\Delta_{COAL}$, respectively, yields:

$$V_{ASH}=[(\rho_{AVG}-\rho_{COAL})-(\rho_{AVG}-\rho_B)/(\rho_{AVG}-\rho_{COAL})]*100 \quad (30)$$

Solving for $\rho_B$ yields equation:

$$\rho_B=\rho_{AVG}+[V_{ASH}*(\rho_{AVG}-\rho_{COAL})/100]-(\rho_{AVG}-\rho_{COAL}) \quad (31)$$

By using the average saturated density values for shale, sandstone, and limestone, that would correspond to the 100% formation matrix line (FIG. 9) equaling a $\rho_{AVG}$ value of 2.6 g/cm$^3$ and minimum $\rho_{COAL}$ value of 1.1 g/cm$^3$, equation 31 becomes:

$$\rho_B=(V_{ASH}*0.015)+1.1 \quad (32)$$

Figure 10:
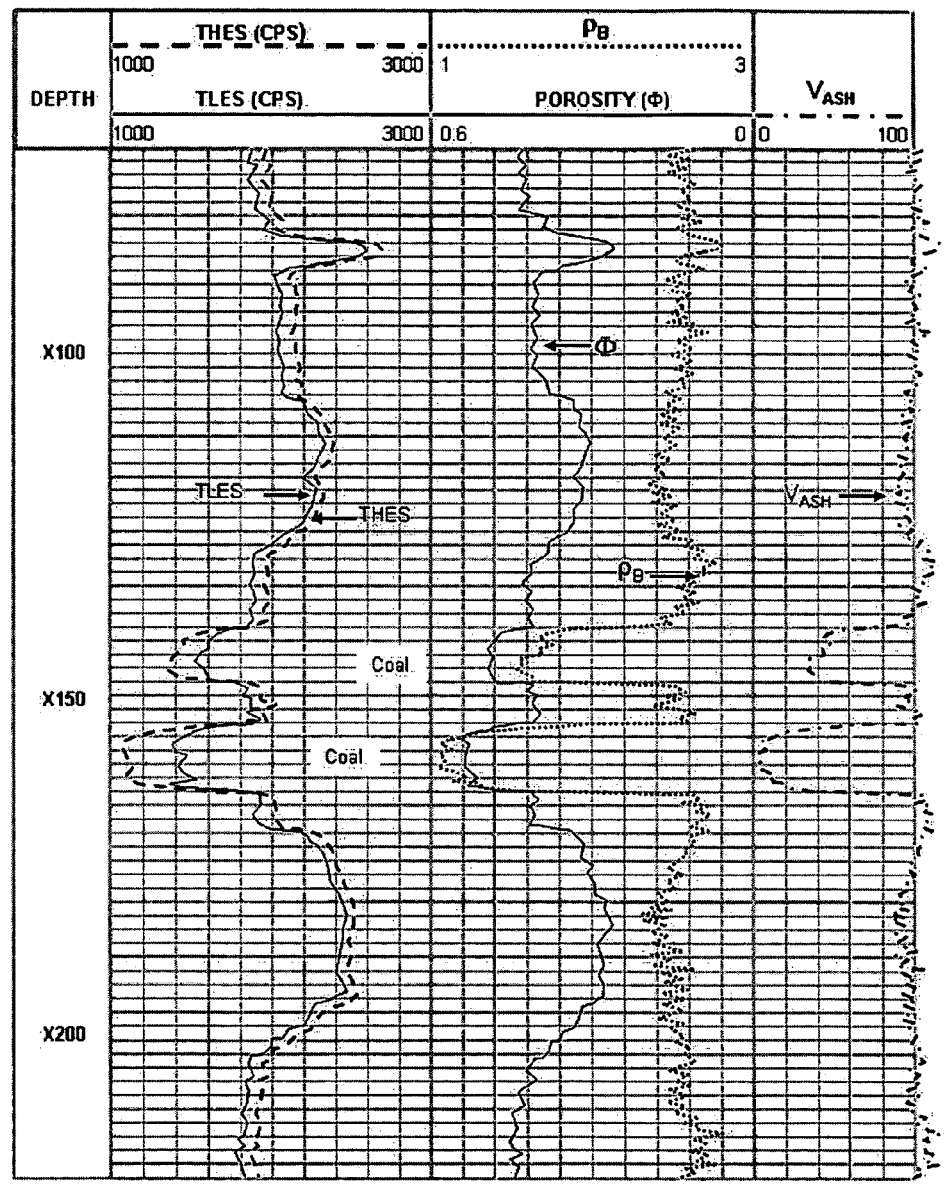
FIG. 10 is a representative log format record of processed and derived data for coal bed formations in accordance with this invention.

$\rho_{AVG}$ and $\rho_{COAL}$ in equation 31 can be adjusted to known values in a field/formation specific application. $V_{ASH}$ and $\rho_B$ can be presented in a log format (FIG. 10).

Figure 11:
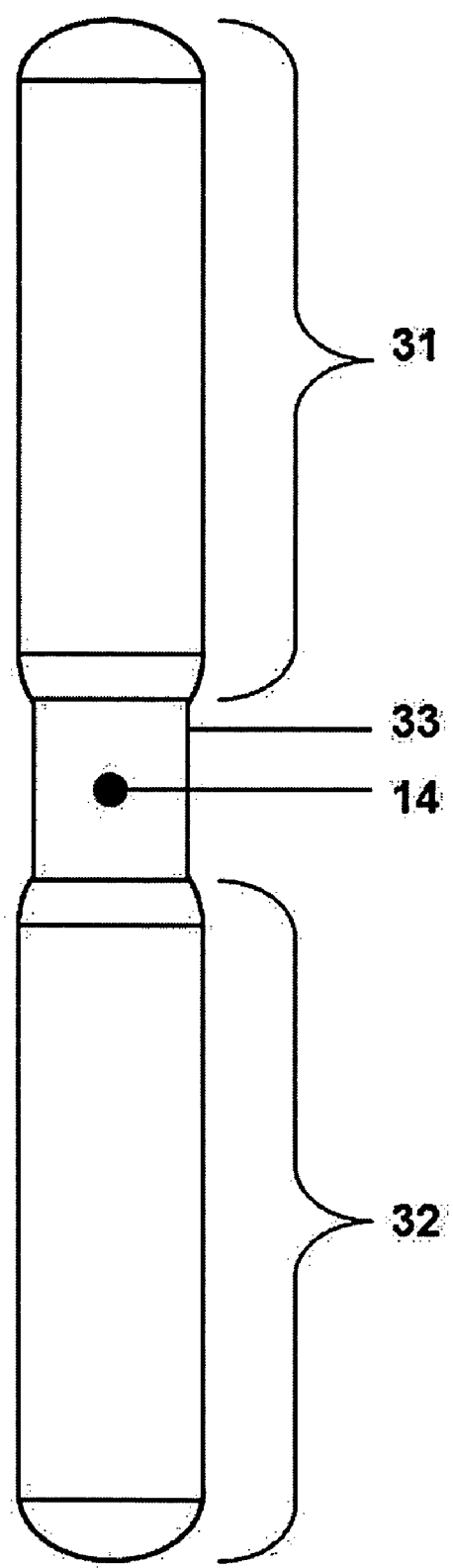
FIG. 11 is a sectional view showing a N-N logging tool being coupled with a N-G logging tool and permitting practice of the present invention without necessitating the use of a logging tool having integrated N-N/N-G systems of the nature shown in FIG. 1.

The basic scope of the present invention concerns gathering well logging data by means of dual N-N detectors and a N-G detector and processing that data according to the computations set forth herein. However, the present invention may be effectively practiced via the use of a number of different tooling arrangements and data processing arrangements. For example, rather than employing a single integrated well logging instrument having both N-N and N-G detector capability as shown in FIG. 1, two different well logging instruments may be coupled in assembly as shown in FIG. 11, one logging instrument being a N-N well logging instrument (31) and the other being a N-G well logging instrument (32). The neutron emitting source (14) could be positioned in either of the tools or in the coupling (33) provided that an optimum spacing for the respective detectors is maintained. Each of these logging instruments may have independent detection and recording capability if desired and the recorded data may be downloaded and merged for electronic processing. Though not deemed particularly practical, N-N and N-G logging instruments could be run separately in a wellbore and the recorded formation data from each may be subsequently downloaded, merged and processed in the manner set forth herein.

It is highly desirable that a well logging system be provided that facilitates the detection and volumetric measurement of any coal that is present within the formation matrix. It is also desirable to provide a well logging system that may be run within well casing, thereby permitting wells to be drilled and cased, especially relatively shallow wells that are prevalent in methane gas production regions. This feature permits a drilling rig to be moved off site after well drilling has been completed and permits a well logging system to be employed at a later time for determination of the depth of detected coal or other mineral products of interest. Since the logging instrument may be run on wire-line, coiled tubing, jointed tubing, etc., the overall costs for well drilling, logging and perforation or other completion activities will be significantly minimized. Drilling rigs will be eliminated from the site time that is typically required for well logging.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for well logging for determining porosity ($\Phi$), sigma water apparent ($\Sigma_{WA}$) and sigma log ($\Sigma_{LOG}$), in oil and gas reservoirs, and simultaneously determining ash volume ($V_{ASH}$) and bulk density($\rho_B$) in coal bed formations, comprising running a logging instrument through a wellbore traversing a plurality of earth formations, the logging instrument having a single source of neutrons for irradiating earth formations surrounding the wellbore and having two substantially identical Neutron-Neutron detectors being vertically spaced at differing distances from the single source of neutrons, said logging instrument having a Neutron-Gamma detector surrounded by a rare earth shield having a high capture cross-section and subsequent plurality emitting capture gamma radiation and a scintillation crystal acting in concert to moderate neutron activity in the wellbore and near-bore adjacent formations and detecting the intensity of a modified aggregate capture gamma radiation spectrum;

detecting thermal neutrons by said Neutron-Neutron detectors;

converting said detected thermal neutrons into electrical pulses;

recording said electrical pulses as time events in counts/second for each of said Neutron-Neutron detectors;

using a ratio of Neutron-Neutron detector count rates for pore volume determination;

simultaneously detecting modified capture gamma radiation from the irradiated earth formation with said shielded Neutron-Gamma detector and converting the modified capture gamma radiation into equivalent electronic pulses;

proportioning the electronic pulses into sequential low and sequential high energy ranges;

recording the electronic pulses in a time event as counts/second;

quantifying and comparing count rates of the sequential low and sequential high energy ranges to said pore volume of the irradiated earth formation to derive sigma water apparent ($\Sigma_{WA}$), sigma log ($\Sigma_{LOG}$), and earth formation matrix; and comparing said count rates of the sequential high energy range with that of the sequential low energy range in earth coal formation matrix to derive an ash volume ($V_{ASH}$) and bulk density ($\rho_B$) for any coal present in the formation matrix.

2. The method of claim 1, comprising:

shielding said Neutron-Gamma detector with a rare earth shield having a high capture cross-section for neutrons and a significant thermal neutron induced capture gamma radiation energy response in the low energy sum aggregate spectrum and an insignificant capture gamma radiation response in the high energy sum aggregate spectrum;

recording said equivalent electronic pulses as a time event as counts/second and proportioning said time event into low and high energy sum aggregate spectrums;

deriving pore volume fluid as to the presence or absence of hydrocarbons in the formation and deriving apparent sigma water by electronically comparing said low and high energy sum aggregate spectrums quantified by the pore volume determination of said Neutron-Neutron detectors;

simultaneously deriving ash volume by said comparison;

generating sigma log with water saturation of the formation by incorporating apparent sigma water with the pore volume determination of said Neutron-Neutron detectors and generating a bulk density of coal bearing formations using said ash volume.

3. The method of claim 1, comprising:

said running of said logging instrument being movement of said logging instrument through a casing lining the wellbore and accomplishing well logging with said logging instrument located within the casing.

4. A logging instrument for conducting well logging along the depth of a wellbore or well casing traversing a plurality of earth formations for determining ash volume ($V_{ASH}$) and bulk density ($\rho_B$) in coal bed formations, comprising:

a logging instrument housing;

a single source of neutrons within said logging instrument housing positioned for irradiating earth formations surrounding the wellbore;

first and second Neutron-Neutron detectors within said single logging instrument housing and being vertically spaced at differing distances from said single source of neutrons;

a Neutron-Gamma detector within said logging instrument housing being different from said first and second Neutron-Neutron detectors and being positioned for detection of gamma radiation from the surrounding earth formation by radiation from said single source of neutrons;

said Neutron-Gamma detector having a surrounding rate earth shield having a high capture cross-section for moderating neutron activity in the wellbore and near-bore adjacent formations and subsequent plurality emitting capture gamma radiation detecting the intensity of a modified aggregate capture gamma radiation spectrum for the determination of ash volume ($V_{ASH}$) and bulk density($\rho_B$) in coal bed formations; and a microprocessor and electronic memory within said logging instrument and being electronically coupled with and receiving detector response signals from said first, and second Neutron-Neutron detectors and said Neutron-Gamma detector.

5. The logging instrument of claim 4, comprising:

an insulated chamber containing said Neutron-Gamma detector having a scintillation crystal a photomultiplier tube and a heat sink;

a rare earth shield surrounding said scintillation crystal; and an antimagnetic shield surrounding said photomultiplier tube.

6. The logging instrument of claim 4, comprising:

a shield within said logging instrument between said source of neutrons and said Neutron-Neutron detector; and a shield within said logging instrument between said source of neutrons and said Neutron-Neutron detectors.

7. A logging instrument for determining porosity ($\Phi$), sigma water apparent ($\Sigma_{WA}$), and sigma log ($\rho_{LOG}$) in oil and gas reservoirs and simultaneously determining ash volume ($V_{ASH}$) and bulk density ($\rho_B$) in coal bed formations, comprising:

a housing of sufficient structural integrity to resist the hydrostatic pressure at the bottom of a well for which logging is intended;

a single neutron emitting source being located within said housing and irradiating earth formations surrounding the wellbore;

a near Neutron-Neutron detector and a far Neutron-Neutron detector being located within said single housing and being at different vertically spaced proximity relative to said single neutron emitting source, said near and far Neutron-Neutron detectors each detecting back scattered thermal neutrons and converting the back scattered thermal neutrons to electronic pulses that are proportional to the neutron collision in each Neutron-Neutron detector;

a neutron shield being located between said single neutron emitting source and said near and far Neutron-Neutron detectors and preventing a direct path for neutron emissions from said single neutron emitting source to said near and far Neutron-Neutron detectors;

an insulated chamber being located within said single housing;

a Neutron-Gamma detector being located within said insulated chamber and being shielded from said single neutron emitting source, said Neutron-Gamma detector detecting a thermal neutron induced aggregate capture gamma radiation spectrum; and a shield of selected rare earth material surrounding said Neutron-Gamma detector and having a high capture cross-section for neutrons with a significant capture gamma radiation response in the TLES part of the aggregate spectrum and an insignificant capture gamma radiation response in the THES part of the aggregate spectrum which allows for said Neutron-Gamma detector to detect the intensity of a modified aggregate capture gamma radiation spectrum for the determination of ash volume ($V_{ASH}$) and bulk density($\rho_B$) in coal bed formations.

8. A method for conducting well logging and identifying formation porosity and matrix along the depth of a wellbore, comprising passing within a wellbore a neutron source and a pair of substantially identical Neutron-Neutron (N-N) detectors being located at differing distances from the source and a shield preventing a direct path of neutrons from the source to said N-N detectors; and detecting thermal neutrons back scattered from the wellbore and formation with said N-N detectors and simultaneously with a Neutron-Gamma (N-G) detector having a scintillation crystal and photomultiplier tube and a surrounding shield of a rare earth material, detecting a modified capture gamma radiation spectrum and converting the detected capture gamma radiation into equivalent electrical pulses recorded as a time event as counts/second proportioned as a total low energy sum (TLES) and a total high energy sum (THES) of the modified capture gamma radiation spectrum;

comparing the count rate of said THES with that of said TLES for determination of the presence or absence of hydrocarbons and quantifying apparent sigma water ($\Sigma_{WA}$) determination with that of a pore volume ($\Phi$) determined from the ratio of said N-N detectors;

incorporating sigma water ($\Sigma_{WA}$) with that of a pore volume ($\Phi$) determined from the ratio of said N-N detectors, and generating a sigma log ($\Sigma_{LOG}$) identifying accurate water saturation for the corresponding earth formation;

comparing the count rate of said TLES with the responses of said N-N detectors for determination of earth formation matrix change;

comparing the count rate of the THES with that of the TLES in earth coal formation matrix for determination of an ash volume ($V_{ASH}$); and from said ash volume ($V_{ASH}$) value deriving a bulk density ($\rho_B$) for the corresponding earth coal formation.

9. A method for well logging, comprising:

detecting thermal neutrons back-scattered by an earth formation irradiated by a single neutron source with two Neutron-Neutron detectors each being located at differing vertical distances from a single source of neutrons and each being shielded from direct radiation from the single source and the respective detected neutrons being reflected as equivalent electronic pulses being recorded in a timed event;

converting said electronic pulses into equivalent count rates for the respective Neutron-Neutron detectors as counts per second;

deriving a porosity from the ratio of the respective equivalent count rates;

detecting spectral capture gamma radiation from an each formation with a neutron-gamma (N-G) detector being surrounded by a shield composed of a rare earth material having a high capture cross-section for thermal neutron induced capture gamma radiation response, said formation and induced spectral capture gamma radiation being reflected as equivalent pulses regarding energy and intensity being recorded in a timed event;

converting said electronic pulses into equivalent count rates regarding energy and intensity as counts per second;

proportioning said equivalent count rates into a total low energy sum (TLES) and a total high energy sum (THES) of the modified aggregate spectrum;

comparing the count rate of the THES with that of the TLES and establishing differential count rates;

using said differential count rates of the modified aggregate capture gamma spectrum, quantified by said porosity, deriving an apparent sigma water measurement in pore volume formations;

using said apparent sigma water measurement with a derived porosity measurement from the well logging instrument and deriving a sigma log measurement;

comparing said count rate of said THES with the count rate of the TLES in earth coal formation matrix for determination of ash volume value; and employing said ash volume value and deriving the bulk density of the earth coal formation matrix.

10. A logging instrument, comprising:

an instrument housing adapted to be run through a wellbore intersecting a surrounding subsurface formation;

a single neutron source within said instrument housing positioned for irradiation of the surrounding subsurface formation;

a pair of Neutron-Neutron detectors within said instrument housing being spaced at different vertical intervals from said single neutron source and being shielded from direct radiation by neutron emission of said source, said pair or Neutron-Neutron detectors determining sigma log ($\Sigma_{LOG}$) by simultaneously, detecting thermal neutrons back-scattered from the subsurface formation with said Neutron-Neutron detectors for the determination of porosity ($\Phi$); and a rare earth sleeved Neutron-Gamma detector within said instrument housing detecting the intensity of a modified aggregate capture gamma radiation spectrum from the surrounding earth formation responsive to neutron emission from said single source of neutrons for the determination of sigma water apparent ($\Sigma_{WA}$) in conjunction with said porosity in oil and gas reservoirs and for determining bulk density ($\rho_B$) by detecting the intensity of a modified aggregate capture gamma radiation spectrum for the determination of ash volume ($V_{ASH}$) in coal bed formations.

11. A method for well logging, comprising:

with a single source of neutrons of a logging instrument within a wellbore, irradiating a surrounding earth formation;

detecting back-scattered thermal neutrons from the earth formation with a pair of substantially identical Neutron-Neutron detectors of the logging instrument each being located at differing vertical distances from the single source and being shielded from direct radiation of the single source and converting the back-scattered thermal neutrons to electronic pulses being proportional to the neutron collision in each Neutron-Neutron detector;

using a single source for determining sigma log ($\Sigma_{LOG}$) by simultaneously, detecting thermal neutrons with a pair of Neutron-Neutron detectors for the determination of porosity ($\Phi$);

simultaneously in conjunction with said porosity detecting the intensity of a modified aggregate capture gamma radiation spectrum from radiation of said single source of neutrons with a rare earth sleeved Neutron-Gamma detector for the determination of sigma water apparent ($\Sigma_{WA}$), in oil and gas reservoirs; and for determining bulk density ($\rho_B$) by detecting the intensity of a modified aggregate capture gamma radiation spectrum with said rare earth sleeved neutron-gamma detector for the determination of ash volume ($V_{ASH}$) in coal bed formations.

* * * * *